United States Patent
Murthy et al.

(10) Patent No.: US 11,865,740 B2
(45) Date of Patent: Jan. 9, 2024

(54) SYSTEMATIC DISPOSAL, CLASSIFICATION AND DYNAMIC PROCUREMENT OF RECYCLABLE RESIN

(71) Applicant: Tata Consultancy Services Limited, Mumbai (IN)

(72) Inventors: Swati Murthy, Bangalore (IN); Rameshwar Gongireddy, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 396 days.

(21) Appl. No.: 17/348,263

(22) Filed: Jun. 15, 2021

(65) Prior Publication Data
US 2022/0019842 A1    Jan. 20, 2022

(30) Foreign Application Priority Data
Jun. 15, 2020  (IN) .............................. 202021025088

(51) Int. Cl.
*B29B 17/02* (2006.01)
*G06V 10/44* (2022.01)
(Continued)

(52) U.S. Cl.
CPC .......... *B29B 17/02* (2013.01); *G06F 18/2413* (2023.01); *G06N 3/04* (2013.01);
(Continued)

(58) Field of Classification Search
CPC ............ B29B 17/02; B29B 2017/0203; B29B 2017/0279; B29B 2017/0282;
(Continued)

(56) References Cited

U.S. PATENT DOCUMENTS

| | | | |
|---|---|---|---|
| 11,030,763 B1* | 6/2021 | Srivastava | G06T 7/557 |
| 2018/0016096 A1* | 1/2018 | Krishnamurthy | B65F 1/14 |
| 2020/0010271 A1* | 1/2020 | Bourn | G06V 10/82 |

FOREIGN PATENT DOCUMENTS

WO    WO2019/056102    3/2019

OTHER PUBLICATIONS

Sachin Hulyalkar et al., "Implementation of smartbin using convolutional neural networks", Journal, Apr. 2018, vol. 5, Issue: 4, IRJET, https://www.irjet.net/archives/V5/14/IRJET-V/514756.pdf.
(Continued)

*Primary Examiner* — Christopher M Brandt
(74) *Attorney, Agent, or Firm* — Finnegan, Henderson, Farabow, Garrett & Dunner, LLP (57) ABSTRACT

This disclosure relates method and system for systematic disposal and dynamic procurement of recyclable waste resin. Typical systems for disposal and procurement of recyclable resin pose challenges such as lack of segregation and collection of different types of plastics, data on recycling centers in proximity, uncertainty over resin identification codes, and so on. The disclosed system provides a framework having multiple smart collection units that may be communicatively coupled with a server. The smart bins are capable of collecting plastic items and taking multiple images thereof. The system determines information on type, weight, and location of the plastic resin in the plastic item by means of a trained CNN model, and stores in a repository. The system further includes a route optimization model that is enables selection of a set of collection units for procurement of the resin (of a specific type and a specific quantity).

9 Claims, 6 Drawing Sheets

(51) Int. Cl.
  *G06N 3/04* (2023.01)
  *G06N 3/08* (2023.01)
  *G06F 18/2413* (2023.01)
  *G06V 10/82* (2022.01)

(52) U.S. Cl.
  CPC .............. *G06N 3/08* (2013.01); *G06V 10/454* (2022.01); *G06V 10/82* (2022.01)

(58) Field of Classification Search
  CPC ........ G06F 18/2413; G06N 3/04; G06N 3/08; G06V 10/454; G06V 10/82; G06V 2201/06; Y02W 30/62; B07C 5/3412; B07C 5/342; G06Q 30/0202
  See application file for complete search history.

(56) References Cited

OTHER PUBLICATIONS

Shivaank Agarwala et al., "Ravindra Gudib and Paresh Saxenaa", Application of Computer Vision Techniques for Segregation of Plastic Waste based on Resin Identification Code, Computer Vision and Pattern Recognition, Nov. 2020, Arxiv, https://arxiv.org/pdf/2011.07747.pdf.

Desi Tomaselli, "Automated Recycling System Using Computer Vision", Computer Vision and Pattern Recognition, Nov. 2019, CPB, https://cpb-us-w2.wpmucdn.com/muse.union.edu/dist/d/600/files/2019/11/ECE498_Final_Paper.pdf.

Teoh Ji Sheng et al., "An Internet of Things Based Smart Waste Management System Using LoRa and Tensorflow Deep Learning Model", IEEE Access, Aug. 2020, vol. 8, p. 148793-148811, IEEE, https://ieeexplore.ieee.org/stamp/stamp.jsp?tp=&arnumber=9165744.

Gary White et al., "WasteNet: Waste Classification at the Edge for Smart Bins", Computer Vision and Pattern Recognition—Computers and Society, Jun. 2020, Arxiv, https://arxiv.org/pdf/2006.05873.pdf.

Piotr Nowakowski et al., "Application of deep learning object classifier to improve e-waste collection planning", Waste Management, May 2020, vol. 109, pp. 1-9, Elsevier Link: https://www.sciencedirect.com/science/article/pii/S0956053X20302105.

Rumana Sultana, "Trash and Recyclable Material Identification Using Convolutional Neural Networks (CNN)", SoutheastCon, Mar. 2020, IEEE Link: http://libres.uncg.edu/ir/wcu/f/Sultana2020.pdf.

Ayodeji Noiki et al., "Smart waste bin system: a review", IOP Conference Series: Earth and Environmental Science, 2021, IOP Science, https://iopscience.iop.org/article/10.1088/1755-1315/655/1/012036/pdf.

* cited by examiner

INPUT VOLUME X (7X3X3)

| 0 | 0 | 0 | 0 | 0 | 0 | 0 |
|---|---|---|---|---|---|---|
| 0 | 2 | 4 | 2 | 2 | 5 | 0 |
| 0 | 0 | 2 | 5 | 2 | 2 | 0 |
| 0 | 3 | 4 | 5 | 1 | 2 | 0 |
| 0 | 1 | 1 | 1 | 2 | 3 | 0 |
| 0 | 2 | 3 | 4 | 2 | 0 | 0 |
| 0 | 0 | 0 | 0 | 0 | 0 | 0 |

| 0 | 0 | 0 | 0 | 0 | 0 | 0 |
|---|---|---|---|---|---|---|
| 0 | 1 | 2 | 4 | 0 | 5 | 0 |
| 0 | 2 | 3 | 1 | 2 | 2 | 0 |
| 0 | 3 | 4 | 4 | 4 | 2 | 0 |
| 0 | 2 | 3 | 1 | 2 | 5 | 0 |
| 0 | 2 | 3 | 4 | 2 | 0 | 0 |
| 0 | 0 | 0 | 0 | 0 | 0 | 0 |

| 0 | 0 | 0 | 0 | 0 | 0 | 0 |
|---|---|---|---|---|---|---|
| 0 | 2 | 1 | 3 | 4 | 5 | 0 |
| 0 | 5 | 2 | 1 | 3 | 2 | 0 |
| 0 | 1 | 1 | 2 | 3 | 2 | 0 |
| 0 | 2 | 1 | 3 | 4 | 5 | 0 |
| 0 | 1 | 2 | 3 | 5 | 1 | 0 |
| 0 | 0 | 0 | 0 | 0 | 0 | 0 |

FILTER W0 (3X3X3)

| 1 | 0 | 1 |
|---|---|---|
| 0 | -1 | 0 |
| 3 | 0 | -3 |

| 1 | 2 | 1 |
|---|---|---|
| -1 | 1 | 0 |
| -2 | 0 | 1 |

| 0 | 0 | 1 |
|---|---|---|
| 0 | -2 | 0 |
| 2 | 0 | -2 |

FILTER W1 (3X3X3)

| 1 | 0 | 1 |
|---|---|---|
| 0 | -3 | 0 |
| 3 | 0 | -1 |

| 1 | 1 | 1 |
|---|---|---|
| -1 | 1 | 0 |
| -2 | 1 | 1 |

| 0 | 1 | 1 |
|---|---|---|
| 2 | -2 | 0 |
| 2 | 0 | 1 |

OUTPUT VOLUME (5X5X3)

| -12 | 1 | 34 | -12 |
|---|---|---|---|
| -24 | -21 | 23 | 23 |
| 0 | -2 | 23 | 12 |
| 12 | 22 | -26 | 16 |
| 6 | -14 | 9 | 10 |

| 12 | 22 | 25 | -12 |
|---|---|---|---|
| 16 | 20 | 12 | 15 |
| -12 | -13 | -9 | 24 |
| -12 | 24 | -4 | 1 |
| 0 | -14 | 9 | 10 |

SYSTEMATIC DISPOSAL, CLASSIFICATION AND DYNAMIC PROCUREMENT OF RECYCLABLE RESIN

PRIORITY CLAIM

This U.S. patent application claims priority under 35 U.S.C. § 119 to: India Application No. 202021025088, filed on Jun. 15, 2020. The entire contents of the aforementioned application are incorporated herein by reference.

TECHNICAL FIELD

The disclosure herein generally relates to handling of recyclable resin, and, more particularly, to system, apparatus and method for systematic disposal, classification and procurement of recyclable resin using a machine learning based system.

BACKGROUND

Single-use plastics, often also referred to as disposable plastics, include items intended to be used only once before they are thrown away or recycled. Single-use plastics are commonly used for plastic packaging. These include, among other items, grocery bags, food packaging, bottles, straws, containers, cups and cutlery.

Due to its extensive use, single-use plastics has become a major portion of waste, and this has led to great danger to environment. Only less than 16% of plastic waste recycled globally. Packaging uses 42% of world's primary plastics. 55% of global plastic is discarded or mismanage. Kuwait, Guyana, Germany, Netherlands, Ireland, United States generate more than 10 times higher per capita than most other countries. The World Economic Forum predicts that in three decades from now, plastic waste in the oceans may outweigh the fish.

Key challenges in efficient disposal of single-use plastics and procurement of recyclable resin, includes, but are not limited to lack of segregation and collection of different types of plastics, data on recycling centers in proximity, uncertainty over resin identification codes, and so on.

SUMMARY

Embodiments of the present disclosure present technological improvements as solutions to one or more of the above-mentioned technical problems recognized by the inventors in conventional systems. For example, in one embodiment, a method for systematic disposal, classification and dynamic procurement of recyclable resin is provided. The method includes obtaining, via one or more hardware processors, plurality of input images of a plastic item using an image sensor, a location of the plastic item using a location sensor, and weight of the plastic item using a weight sensor. Further, the method includes predicting, by a trained convolution neural network (CNN) model, a type of resin associated with the plastic item based on the plurality of input images, the location and the weight of the plastic item, via the one or more hardware processors. Herein training the CNN model comprises receiving a training data at the CNN model, the training data comprising a plurality of training images captured through various orientations of a plurality of plastic items, and weight and location data of the plurality of plastic items; extracting, by using a plurality of filters, a plurality of features from the training data by processing an image data associated with the images to obtain a plurality of physical attributes, and processing non-image data comprising the weight and location of a plurality of plastic items, wherein the image data is processed by a convolution component of the CNN model and the non-image data is processed by a feedforward component of the CNN model, and wherein one or more localized areas of the plurality of training images and computed through Histogram of Oriented Gradients; mapping the plurality of features with a set of resin identification codes based on the plurality of physical attributes to identify a label for the plastic item, wherein the label comprises a type of resin of the plastic item; associating the type of resin associated with the plastic items of the training data based on the plurality of features; and sharing, via the one or more hardware processors, the type of resin, weight and location of the plastic item with a sever.

In another aspect, a system for systematic disposal, classification and dynamic procurement of recyclable resin is provided. The system includes a memory storing instructions, one or more communication interfaces, and one or more hardware processors coupled to the memory via the one or more communication interfaces, wherein the one or more hardware processors are configured by the instructions to: obtain plurality of input images of a plastic item using an image sensor, a location of the plastic item using a location sensor, and weight of the plastic item using a weight sensor; and predict, by a trained CNN model, a type of resin associated with the plastic item based on the plurality of input images, the location and the weight of the plastic item, via the one or more hardware processors. To train the CNN model, the one or more hardware processors are configured by the instructions to receive a training data at the CNN model, the training data comprising a plurality of training images captured through various orientations of a plurality of plastic items, and weight and location data of the plurality of plastic items; extract, by using a plurality of filters, a plurality of features from the training data by processing an image data associated with the images to obtain a plurality of physical attributes, and processing non-image data comprising the weight and location of a plurality of plastic items, wherein the image data is processed by a convolution component of the CNN model and the non-image data is processed by a feedforward component of the CNN model, and wherein one or more localized areas of the plurality of training images and computed through Histogram of Oriented Gradients; map the plurality of features with a set of resin identification codes based on the plurality of physical attributes to identify a label for the plastic item, wherein the label comprises a type of resin of the plastic item; associate the type of resin associated with the plastic items of the training data based on the plurality of features. The one or more hardware processors are further configured by the instructions to share the type of resin, weight and location of the plastic item with a sever.

In yet another aspect, a non-transitory computer readable medium for a method for systematic disposal, classification and dynamic procurement of recyclable resin is provided. The method includes obtaining, via one or more hardware processors, plurality input images of a plastic item using an image sensor, a location of the plastic item using a location sensor, and weight of the plastic item using a weight sensor. Further, the method includes predicting, by a trained CNN model, a type of resin associated with the plastic item based on the plurality of input images, the location and the weight of the plastic item, via the one or more hardware processors. Herein training the CNN model comprises receiving a training data at the CNN model, the training data comprising a plurality of training images captured through various orientations of a plurality of plastic items, and weight and location data of the plurality of plastic items; extracting, by using a plurality of filters, a plurality of features from the training data by processing an image data associated with the images to obtain a plurality of physical attributes, and processing non-image data comprising the weight and location of a plurality of plastic items, wherein the image data is processed by a convolution component of the CNN model and the non-image data is processed by a feedforward component of the CNN model, and wherein one or more localized areas of the plurality of training images and computed through Histogram of Oriented Gradients; mapping the plurality of features with a set of resin identification codes based on the plurality of physical attributes to identify a label for the plastic item, wherein the label comprises a type of resin of the plastic item; associating the type of resin associated with the plastic items of the training data based on the plurality of features; and sharing, via the one or more hardware processors, the type of resin, weight and location of the plastic item with a sever.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

A colossal amount of plastic waste being generated is posing grave risks to the health of people as well as environment. In order for a product or material to be truly described as 'sustainable' it must be environmentally, economically and socially sustainable. Plastic can positively contribute to the sustainability if it can be made environmentally, economically and socially sustainable. However, there are certain challenges with sustainability of single-use plastics during the lifecycle of plastic recycling. A typical lifecycle of plastic recycling is illustrated in FIG. 1.

Figure 1:
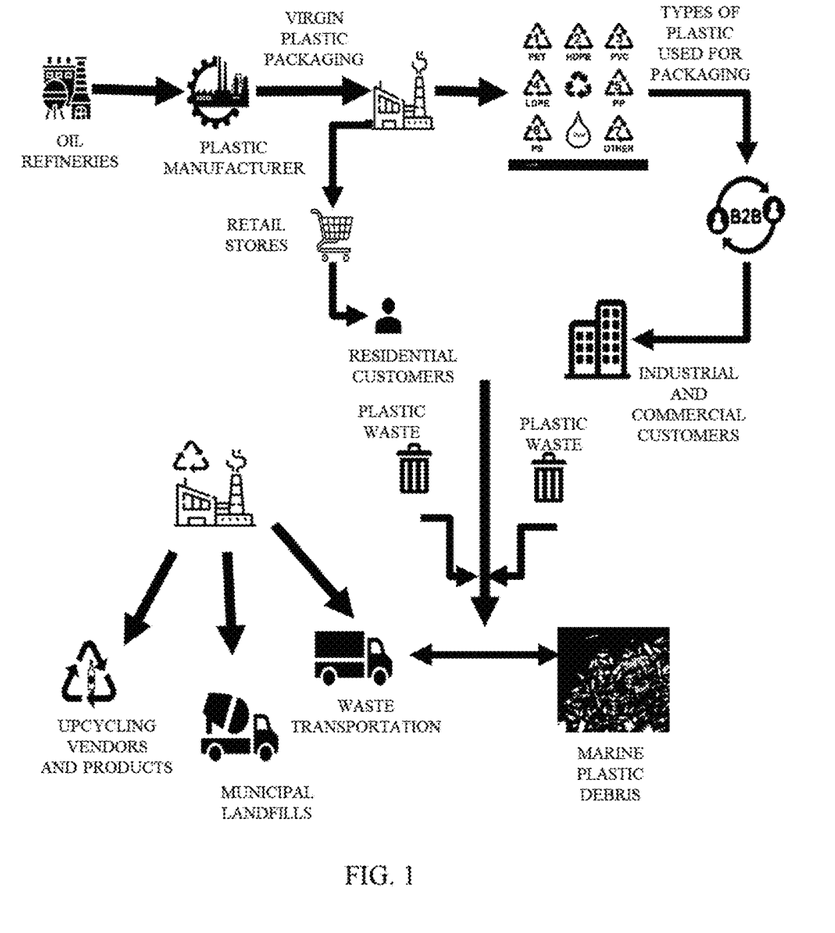
FIG. 1 illustrates a typical lifecycle of plastic recycling.

Referring to FIG. 1, raw material, from oil refineries is transported to plastic manufacturers for producing packaging plastic. The plastic so produced is of various types and packaging. For example, the plastic may be High Density Polyethylene (HDPE), Polyethylene Terephthalate (PET), (Polyvinyl Chloride) PVC, and so on. The plastic packaging is then supplied to retail stores and/or B2B (for example, retail and commercial customers). The plastic packaging supplied to the retail stores is then utilized by residential customers.

The plastic produced and supplied to each of the retail, commercial and residential customers creates a waste, or plastic waste, that has to be disposed. Typically out of a total amount of waste that is being generated, around 40 percent of waste is disposed as marine plastic debris and around 60 percent is transported for recycling. The recycled plastics is being utilized for manufacturing upcycled products by upcycling vendors, creating waste to energy co-incineration, and remaining to municipal landfills.

The manner (as described with reference to FIG. 1) in which the plastic waste is being recycled and disposed of typically is a cause of concern due to various reasons. For example, the number of local vendors available for recycling is limited, and thus scaling of plastic recycling systems is a challenge. Recycling requires collection of post-consumer scrap from consumer locations. There are certain stringent state regulations such as ban on single use plastics that have to be met in new growth markets. Additionally, there is a lack of data visibility on post-consumer scrap. In the present scenario, solutions/smart holistic systems are required that can enable recycling of packaging materials for sustainability scenarios, and further avoid environmental problems such as plastic pollution of oceans in a reliable manner.

Various embodiments disclosed herein provides method and system for efficient handling of single-use plastic in a holistic manner. For example, in one embodiment, a smart collection bin (hereinafter referred to as 'IoT based collection unit') is provided for disposal of the resin. The IoT based collection unit may facilitate in collecting recyclable single-use plastic resins (hereinafter referred to as 'plastic items') for disposal at a source location, for example a collection center. Resin packaging/plastic items that may be collected in the collection IoT based collection unit includes different types of plastic resins including, but not limited to, HDPE, PET, PVC, and so on.

In an embodiment, the disclosed system is capable of classifying/identifying the 'type' and 'quantity' of resin used in plastic items based on a wireless sensing and visual feedback. The system is further capable of determining location of a set of nearest collection centers for collection of the plastic items from the source location. In an embodiment, the system embodies an AI/ML model trained using image sensing and route optimization algorithms to determine the set of nearest collection centers. In an embodiment, the disclosed system may be embodied in the collection unit. In an alternate embodiment, the disclosed system may be embodied in a server communicably coupled to the collection unit. In yet another embodiment, the disclosed system may be embodied at least in parts in the collection unit and the server for efficiently processing images of the plastic item to determine the type and the quantity of the collection units. These are other features of the disclosed method and system are described further in detail in the description below.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 2 through 6, where similar reference characters denote corresponding features consistently throughout the figures, there are shown preferred embodiments and these embodiments are described in the context of the following exemplary system and/or method.

Figure 2:
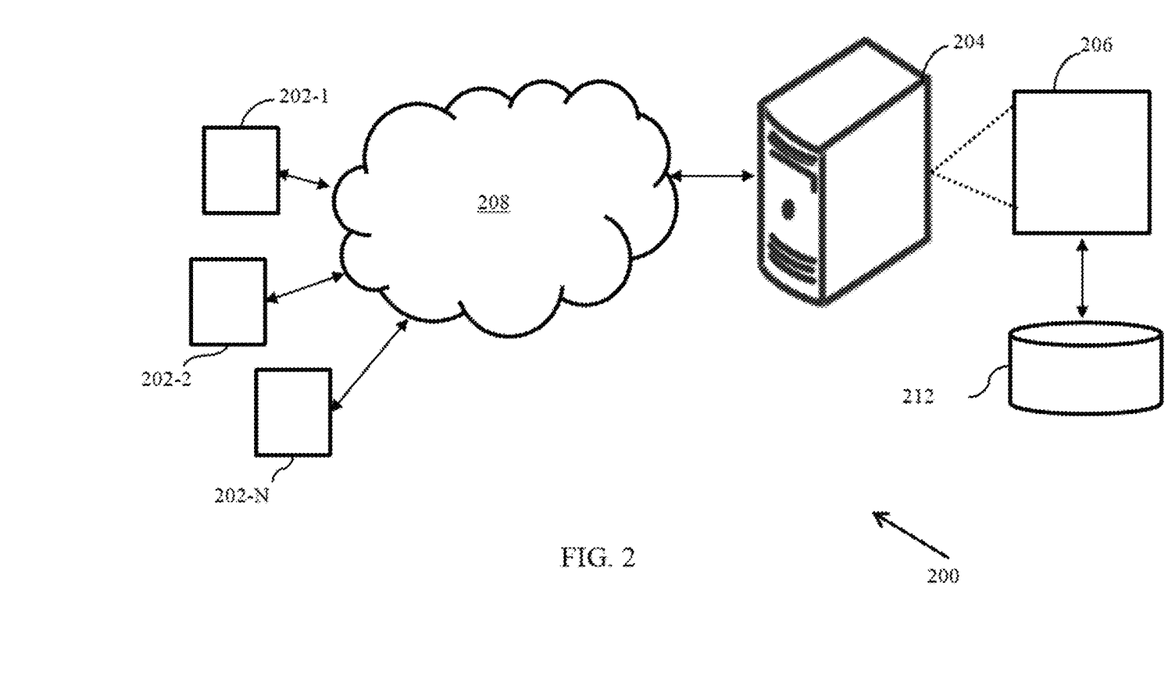
FIG. 2 illustrates an example network implementation of a system for systematic disposal, classification and dynamic procurement of recyclable resin, according to some embodiments of the present disclosure.

FIG. 2 illustrates an example network implementation 200 of a system for systematic disposal and dynamic procurement of recyclable resin, in accordance with an example embodiment. In one embodiment, the network implementation 200 includes one or more collection units, for example, collection unit 202-1, 202-2, . . . 202-N (hereinafter referred to as collection units 202), a server 204, and a communication network 208. It will be noted herein that the number of collection units and/or networks, illustrated in FIG. 2, is provided for explanatory purposes only. In practice or some example scenarios, there may be additional or fewer collection units and/or networks; different collection units and/or networks; or differently arranged collection units and/or networks than illustrated in FIG. 2. Also, in some implementations, one or more of the collection units may perform one or more functions described as being performed by another one or more of the collection units of present in the network implementation 200. It will be understood that the system 202 may be accessed through one or more collection units 202 or applications residing on the collection units 202. The collection units 202 and/or networks of the network implementation 200 may interconnect via wired connections, wireless connections (laser, infrared, RF, optical), or a combination of wired and wireless connections over the communication network 208.

In an embodiment, the communication network 208 may be a wireless or a wired network, or a combination thereof. In an example, the communication network 208 can be implemented as a computer network, as one of the different types of networks, such as virtual private network (VPN), intranet, local area network (LAN), wide area network (WAN), the internet, and such. The communication network 208 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 208 may include a variety of network devices, including routers, bridges, servers, computing devices, storage devices. The network devices within the network 208 may interact with the server 202 through communication links.

The network environment 200 supports various communication links or connectivity options such as BLUETOOTH®, USB, ZigBee and other cellular services. The network environment enables connection of collection unit 202 with the server 204, and accordingly with the database 212 using any communication link including Internet, WAN, MAN, and so on.

The smart collection unit 202 can be exclusively utilized for collecting recyclable single-use plastic resins. Resin packaging to be collected in the collection unit includes different types of plastic resins such as HDPE, PET, PVC, LDPE, PP, PS and so on. In an exemplary embodiment, the collection unit 202 is implemented to operate as a stand-alone device. For example, the collection unit 202 may be a physical collection capable of receiving and accommodating plastic items. An example configuration of the physical collection unit is illustrated with reference to FIG. 4. In another embodiment, the collection unit 202 may be implemented to work as a loosely coupled device in a smart computing environment. For example, the collection unit may assume the form of a virtual collection unit. In such scenario, image of the 'plastic item' to be disposed may be captured by a user that is device enabled by an image recognition technology. Such user device may capture the image and share the image with the sever for further processing to classify the image (by extracting image features from the image). In such a scenario, instead of a physical collection unit, there may be virtual collection of the plastic items at the user's end. And the server may store the location of plastic item by capturing the GPS coordinates of the user's device. Hereinafter, the term 'collection unit' may refer to one of a 'physical collection unit' and a 'virtual collection unit', as described above.

The server 204 may include one or more server devices, or other types of computation and communication devices, for facilitating a fully automated cloud based framework that provides validated, cleansed and harmonized real-time data from various data sources that generate single-use plastic waste and furnish reliable estimates for buyers of recycled plastics. Such sources of data that generate single-use plastic waste may hereinafter be referred to as 'source locations'. Herein, location is an important parameter for the purpose of training the model for prediction. For example, for a collection unit installed in a housing complex location, there may be more personal care products plastic packaging (plastic items) like HDPE, while in malls there may be more beverage type of packaging like PET bottles for carbonated drinks.

In an embodiment, the server 204 may embody a system 206 for disposal and procurement of resin. Although the present disclosure is explained considering that the system 206 is implemented on the server 204, it may be understood that the system 206 may also be implemented in a variety of computing systems, such as a laptop computer, a desktop computer, a notebook, a workstation, a cloud-based computing environment and the like.

As discussed above, the system 206 may be implemented in a computing device, such as a hand-held device, a laptop or other portable computer, a tablet computer, a mobile phone, a PDA, a smartphone, and a desktop computer. The system 206 may also be implemented in a workstation, a mainframe computer, a server, and a network server. In an embodiment, the system 206 may be coupled to a data repository, for example, a repository 212. The repository 212 may store data processed, received, and generated by the system 206. In an alternate embodiment, the system 206 may include the data repository 212. The components and functionalities of the system 206 are described further in detail with reference to FIGS. 3-5B.

Figure 3:
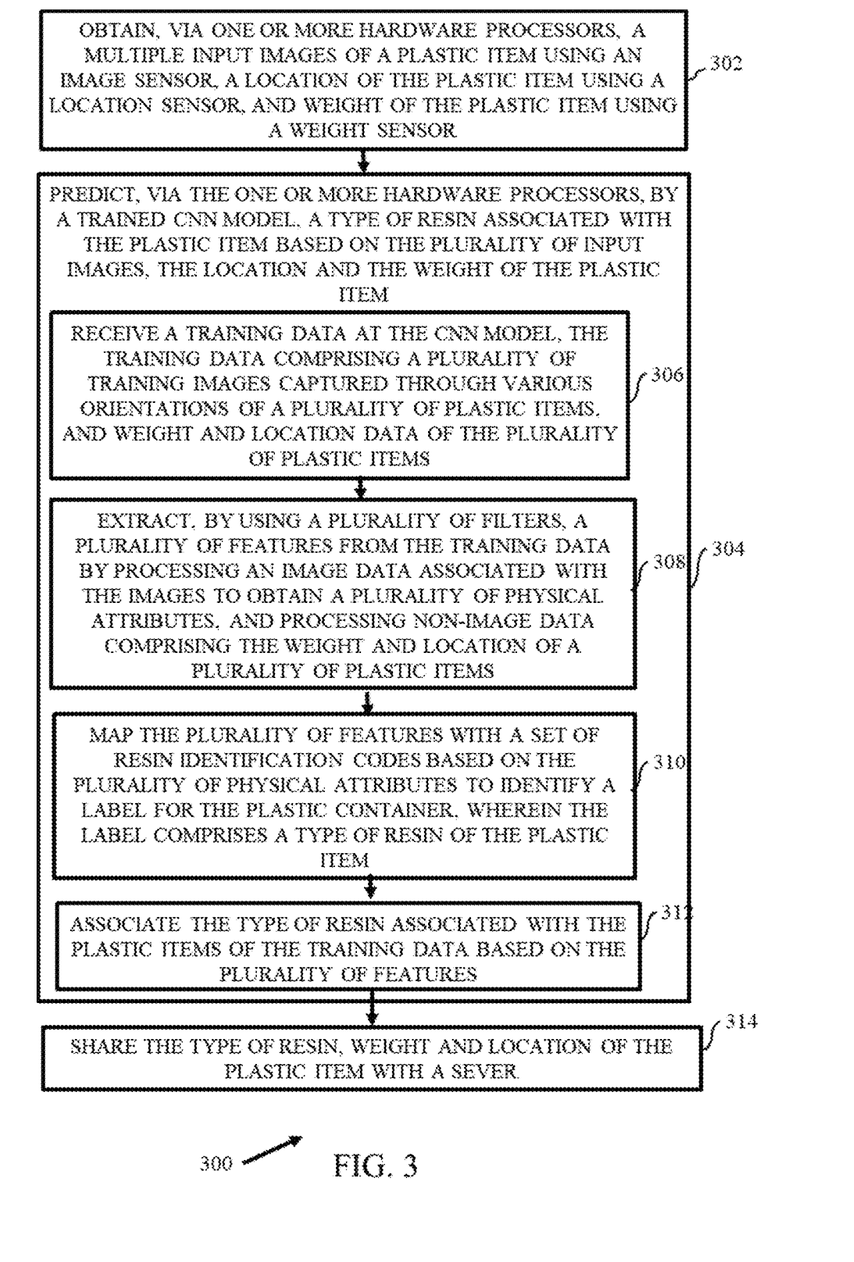
FIG. 3 illustrates a flow diagram of a method for systematic disposal classification and dynamic procurement of recyclable resin in accordance with some embodiments of the present disclosure.

FIG. 3 illustrates a flow diagram of a method 300 for disposal, classification and procurement of recyclable plastic, in accordance with an example embodiment. The method 300 depicted in the flow chart may be executed by a system, for example, the system 206 of FIG. 2. In an example embodiment, the system 206 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of the system 206. However, the operations of the method 300 can be described and/or practiced by using any other system.

The disclosed system may be utilized during a scenario, for example, when a bid is placed for waste plastic resin at a server. The bid includes bid information associated with 'type' of the plastic resin and 'quantity' of plastic resin required. In an embodiment, the bid information may be provided by a user, for example, a buyer of the resin. In an embodiment, the user may provide the bid information using a user interface of the system 206. In an embodiment, the bid information may also include source location of the user. In an embodiment, the source location of the bidder may be captured based on the location coordinates of a user device used by the user for accessing the server.

A plurality of 'sourcing locations' of interest matching with the bid information may be obtained for sourcing the waste plastic resin. Herein a 'sourcing location' may refer to a location from where the bidder may obtain the plastic material. It will be understood that the bins may be located at a plurality of locations in a geographical area, however, the bidder may prefer to obtain the requisite plastic resin from some particular locations due to proximity of bidder's location to those locations, ease of access, availability of requisite type of plastic resin and so on.

In an embodiment, the disclosed system is capable of automatically determining availability of type of plastic resin in a bin configured at a particular location. In an embodiment, the disclosed system may include an artificial intelligence AI/Machine Learning (ML) model for determining availability of the type of plastic resin in the bins configured at various locations. The AI/ML model may further be able to predict a best location to obtain the plastic material based at least on image sensing and route optimization models. In an embodiment, the AI/ML based image sensing model may be pretrained for identifying/classifying the type and quantity of plastic resin at the plurality of sourcing locations of interest based on the plastic items contained in the collection units at such locations. The configuration of the collection units is described further with reference to FIG. 4.

Figure 4:
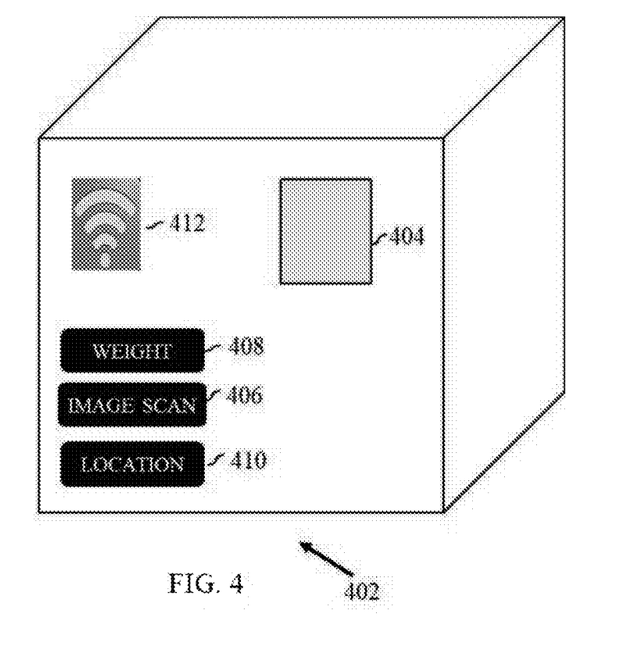
FIG. 4 illustrates an example configuration of an IoT based collection unit for systematic disposal, classification and dynamic procurement of recyclable resin, according to some embodiments of the present disclosure.

Referring to FIG. 4, an example configuration of the collection unit 400 is illustrated, in accordance with an example embodiment. In an embodiment, the collection unit 400 may include an enclosure 402 for collecting the plastic items, and a flexible/configurable opening 404 configured on the enclosure 402 for receiving the plastic items. In an embodiment, the opening 404 of the collection unit 402 may be operable by means of an electronic or mechanical mechanism. It will also be understood that the enclosure may assume a different shape without limiting to the illustrated shape in different applications and variations of the collection unit.

In an embodiment, the collection unit 402 may include, amongst other things, a image sensor (or a media device) 406 for capturing image of the plastic item disposed therein, a weight sensor 408 for determining weight of the plastic items collected therein, a location sensor 410 for instance a GPS position sensor for identifying location of the collection units, and a transceiver 412 for communicating with the other collection units and a server. Herein, it will be understood that the components of the collection unit may assume different configurations and locations within the enclosure without limiting to the illustrated configuration. Additionally or alternatively, the collection unit may include more components for enabling it to effectively determine the item information. For example, the collection unit may include a UI to display the information of the plastic item. In an embodiment, the collection unit may embody a sensor for capturing status of the collection unit. The status herein may refer to, for example, empty bin, full bin, partially full bin and so on.

On disposing a plastic item in the configuration bin, the media sensor (or a media device) 406 captures image of the plastic item. Further, by utilizing a trained AI/ML model, the type and amount of the resin in the plastic item is determined. In an embodiment, the type and amount of the resin in the plastic item may be displayed on the UI of the collection unit. The AI/ML model may be trained on a training data comprising a plurality of images of plastic items using image classification and labeling. An example of process flow of the AI/ML model employed for image classification is described further in description.

Herein, the disclosed system may be configured within the IoT based bin and may be capable of determining the type and weight of plastic resin available at a particular location. When a plastic item is dropped in the bin, the disclosed system may obtain a plurality of input images of the plastic item using one or more image sensors, a location of the plastic item using one or more location sensors, and weight of the plastic item using one or more weight sensors. In an embodiment, the image sensors may be configured to take images of the plastic item with a specific resolution, for instance, 320*240 pixels. In an embodiment, the AI/ML model may be configured in a server device which is communicably coupled to the IoT based bins. Herein, it will be noted that the AI/ML model may be trained and stored at a location accessible to the server 206. For example, in an embodiment, the trained AI/ML model may be stored in the repository 212 accessible to the server via the system 204. In the present embodiment, the image of the plastic item may be shared with the server 206 by the collection unit for processing of the image to identify the type of the resin of the plastic item. Alternatively, the AI/ML model may be stored in a repository associated with the collection unit, and a system embodied in the collection unit is capable of processing the image of the plastic item locally at the collection unit to determine type and the amount of the resin therein. In the present embodiment, the information (type and amount of plastic resin in the plastic item, and location of the plastic item) obtained after processing may be sent by the IoT based collection unit, using the transceiver 412, to the server 204.

At 304, the method 300 includes predicting, by a trained CNN model, a type of resin associated with the plastic item based on the plurality of input images, weight and location of the plastic item, via one or more hardware processors. Herein, the training of the AI/ML is explained below with reference to steps 306-312.

Training the AI/ML model includes receiving a training data at the convolutional neural network (CNN) model at 306. The training data includes a plurality of training images captured through various orientations of a plurality of plastic items, weight of the plurality of plastic items and location data of the plurality of plastic items.

At 308, the method 300 includes extracting, by using a plurality of filters, a plurality of features from the training data by processing an image data associated with the plurality of training images, and processing the data associated with the weight and location of the plurality of plastic items. The image data is processed by a convolution component of the CNN model to obtain a plurality of physical features. The plurality of physical features may include, but are not limited to, resin codes associated with a plurality of resin types, plastic shape (height, width and depth), color of the plastic item, and any textual description printed on the plastic item including, brand logo, brand label, brand description/text on label, and so on. Herein, the following resin codes (mentioned in brackets) are types identified with Resin Identification codes (RIC) for different types of plastics: PETE (1) HDPE (2), PVC (3), LDPE (4), PP (5), PS (6), and Other (7). These resin codes refer to the type of plastic used in the product that helps to facilitate recycling of post-consumer plastics.

Figure 5A:
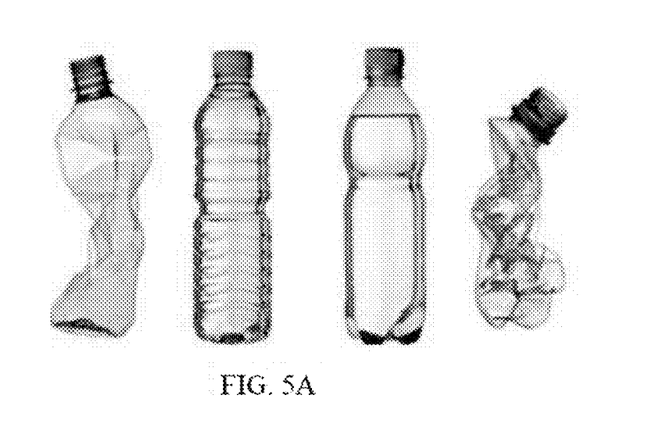
FIG. 5A an example representation of distorted plastic items for use in systematic disposal classification and dynamic procurement of recyclable resin, according to some embodiments of the present disclosure.

The convolution component of the CNN model is capable of identifying different forms of plastic items such as cans, bottles and other items, by identifying the main physical features needed for classification and classify it into a correct label. Given input images of plastic items and the corresponding labels, the CNN automatically learns the features require to classify an image. Due to such capability, any new image of the plastic image can be identified by the CNN model as aggregate class of plastic items if the plastic item possesses the corresponding features. The image of the plastic item can be processed the same way and could be identified as aggregate class of plastic items even if the plastic item is jammed and/and twisted, as illustrated in FIG. 5A.

The plurality of physical attributes indicative of appearance and shape of the object in an image area can be described by the distribution of intensity gradients or the direction of the edges. Localized areas of such images can be computed through Histogram of Oriented Gradients (HoG). The HoGs computes histograms on a dense grid of uniformly-spaced cells. The HOG focuses on shape of the plastic image. HOG technique counts occurrences of gradient orientation in localized portions of plastic image by extracting the gradient and orientation of edges. Once extraction, HOG generates histogram from each cell. Furthermore, these cells can also overlap and be contrast normalized to improve the accuracy of the descriptor. The tanH function may be used as activation function at each layer.

Figure 5B:
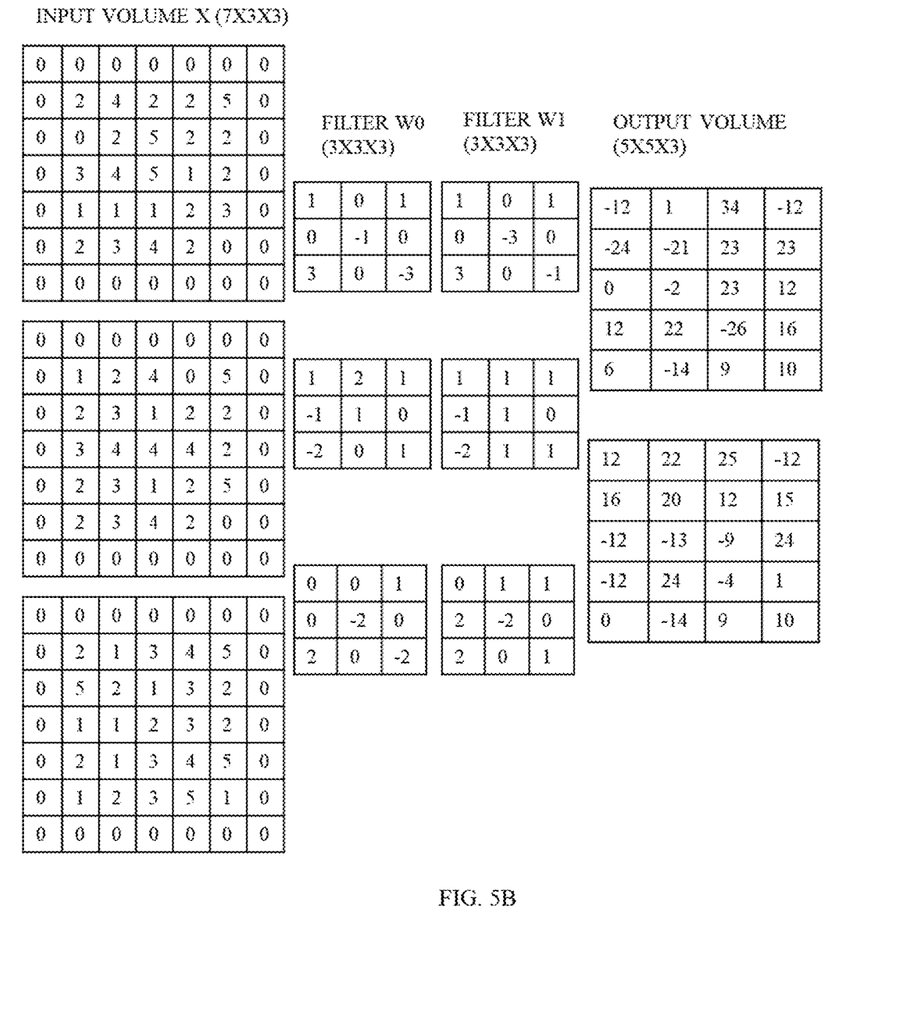
FIG. 5B illustrated an example of filters for use in systematic disposal classification and dynamic procurement of recyclable resin, according to some embodiments of the present disclosure.

During the convolution operation, the RGB/color input image is the input to convolution layer to extract features. The convolution layer consists of a plurality of kernels/filters of filter size of (3*3) with different weights that are used to extract features from the input image. As illustrated in FIG. 5B, the plurality of filters are applied to the input image (or previous layer) to produce a new layer called the output layer, which may have a different height, width, or depth than the input layer. The depth of the filter is equal to the depth of the input layer. The output layer is computed by sliding the filters across the input and performing element-wise multiplication. After multiplication, all the resultant layers are added to produce a single feature map. Said convolution process is repeated for each of the plurality of filters in that layer. The filters are used to detect boundaries of the plastic item. The 2D convolution filter is used for each of channels and added up to get final convoluted image.

A stride of 2 may be used for the number of pixels jump in every iteration. In an example embodiment, Max Pooling may be used to avoid overfitting. The fully connected layer adds all the layers that predicts the image classes from (1 to 7). At this stage, the gradient of the error function is calculated concerning the neural network's weight. The weights and feature detectors are adjusted to optimize performance, and this process is repeated by back propagation method. Batch Gradient Descent optimization function is used to determine in what direction should adjust the weights to get a lower loss than the current one.

There is are multiple varieties of shape, color and other physical attributes of the plastic items that makes it challenging to sort the material of a plastic item just by the image. For example, a glass bottle can be similar to a plastic bottle in every aspect size, color, shape and so make the classification challenging. The aforementioned challenge is addressed by the disclosed method and system by extracting size, deformation and weight of the plastic items.

According to the aforementioned, the CNN model is trained based on the plurality of training images, the location and the weight of the plastic items. Each of the input image (from amongst the plurality of training images) of CNN layer is made up of multiple pixels with every pixel consisting of three different values of RGB (Red-Green-Blue) channels. The image may be (320*240*3), where 320 represents the height, 240 the width, and 3 represents the number of color channels. The total of 76,800 pixels in the data and every pixel has an R-G-B value hence 3 color channels. The plastic items may have different combinations of RGB which may be captured in a receptor. An example of the combined features of color and weights (as outside input) may become a differentiating feature for each plastic item.

| Class | Group | Examples of items | Features | Features subclassification |
|---|---|---|---|---|
| PETE | Classification 1 | water Bottle | logo | sub feature 1 |
|  | Classification 2 | Customer can bottle 1 | bar code | sub feature 2 |
|  | Classification 3 | Non-Customer Can bottle 2 | RGB | sub feature 3 |
|  | Classification 4 | Description on bottle | Brand description | Sub feature 4 |
|  | Classification 5 | Brand label | labelling | Sub feature 5 |
| HDPE | Classification 1 | Trash 1 | Transparent | sub feature 4 |
|  | Classification 2 | Trash 2 | H, W, D | sub feature 5 |
|  | Classification 3 | Trash 3 | Characters on the bottle cap | sub feature 6 |

The weight and the location of the plastic items may also be provided as input to the CNN model to train the model better when input image is of deformed bottles or missing resin ID's. The weights of the plastic and physical attributes such as shape, color, logo, brand name, and input parameters act as additional information of the plastic. The convolution component processes the pixel data and a feed forward component process the non-image data such as weight and location information of the training data. Thus, the disclosed system embodies a multi-input model with the convolution component and the feed-forward component, this multi-input model helps the model to improve accuracy for appropriate detection of plastic items.

At 310, the method 300 includes mapping the plurality of features with a set of resin identification codes based on the plurality of physical attributes to identify a label for the plastic item. Herein, wherein the label includes a type of resin of the plastic bottle. As previously described, each resin type is associated with a resin code. The disclosed CNN model classifies complex plastic type and outputs a variable (resin code) with values between 1 to 7 that are labelled to the type of plastic resin. The resin code is taken into consideration to know the shapes that represent bottles, variations of angles at which the bottles are photographed, etc. At 312, the method 300 includes associating the type of resin with the plastic items of the training data based on the plurality of features.

At 312, the method 300 includes sharing the type of resin, weight and location of the plastic item with the sever. The server may be accessed by a bidder to bid for the plastic items. The server may include a system for predicting a set of sourcing locations from amongst the plurality of sourcing locations that are capable of sourcing the waste plastic resin in addition to an elapsed time (or bid duration) based on the type of resin, weight and location of the plastic item shared with the server. In an embodiment, the system may embody a forecasting model pretrained on a training/historical data to do predict the potential availability of the resin as per the bid information.

As a practical application of the disclosed method and system, the set of sourcing locations predicted by the system may be utilized by the user for placing bids for the plastic resin. For example, the user may place bids for a planned order (a given type and amount of resin) to be procured for a specific time period. In an example scenario, the user may employ a third party collector or self-collects the resin from one or more of the set of sourcing locations over a period of specific time-period for raw material procurement as per purchase order and delivery schedule as per the bid.

Figure 6:
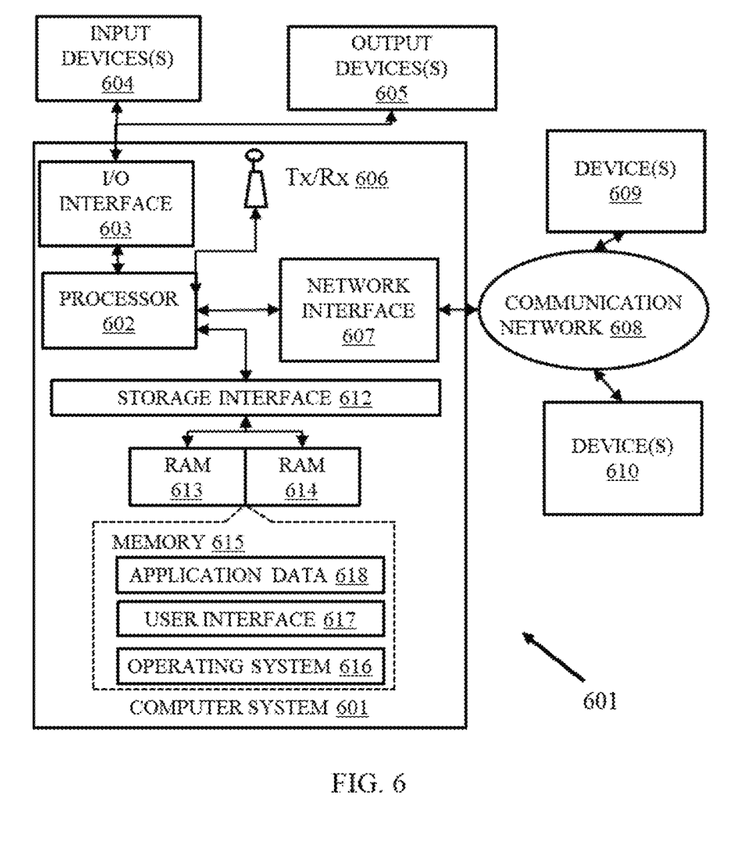
FIG. 6 is a block diagram of an exemplary computer system for implementing embodiments consistent with the present disclosure.

FIG. 6 is a block diagram of an exemplary computer system 601 for implementing embodiments consistent with the present disclosure. The computer system 601 may be implemented in alone or in combination of components of the system 206 (FIG. 2). Variations of computer system 601 may be used for implementing the devices included in this disclosure. Computer system 601 may comprise a central processing unit ("CPU" or "hardware processor") 602. The hardware processor 602 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 602 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609 and 610. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 513, ROM 514, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 616, user interface application 617, user/application data 618 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 601 may store user/application data 618, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the present disclosure or if they include equivalent elements with insubstantial differences from the literal language of the embodiments described herein.

Various embodiments disclosed herein provides method, system and an apparatus for systematic disposal and dynamin procurement of recyclable waste resin. For example, the disclosed system includes a framework having multiple smart collection units that may be communicatively coupled with a server. The smart bins are capable of collecting plastic items and taking an image of the plastic item. The disclosed system is capable of determining the type, quantity (weight), and location of the plastic resin in the plastic item by means of a trained CNN model. The information of the type and quantity of resin in different collection units along with the location information of thereof is stored in a repository. The system further includes a route optimization model that is enables selection of a set of collection units for procurement of the resin (of a specific type and a specific quantity).

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
obtaining, via one or more hardware processors, plurality of input images of a plastic item using an image sensor, a location of the plastic item using a location sensor, and weight of the plastic item using a weight sensor;
predicting, by a trained Convolutional Neural Network (CNN) model, a type of resin associated with the plastic item, based on the plurality of input images, the location and the weight of the plastic item, via the one or more hardware processors, wherein training the CNN model comprises:
receiving a training data at the CNN model, the training data comprising a plurality of training images captured through various orientations of a plurality of plastic items, and weight and location data of the plurality of plastic items,
extracting, by using a plurality of filters, a plurality of features from the training data by processing an image data associated with the plurality of input images to obtain a plurality of physical attributes, and processing non-image data comprising the weight and location of the plurality of plastic items, wherein the image data is processed by a convolution component of the CNN model and the non-image data is processed by a feedforward component of the CNN model, and wherein one or more localized areas of the plurality of training images are computed through Histogram of Oriented Gradients;
mapping the plurality of features with a set of resin identification codes based on the plurality of physical attributes to identify a label for the plastic item, wherein the label comprises a type of resin of the plastic item; and
associating the type of resin associated with the plastic items of the training data based on the plurality of features; and
sharing, via the one or more hardware processors, the type of resin, weight and location of the plastic item with a sever.

2. The method as claimed in claim 1, wherein the image data comprises shape, color, logo, brand name, resin type, brand label, and text printed on the plastic item.

3. The method as claimed in claim 1, wherein processing by the convolution component comprises applying a plurality of filters to the input image to produce an output layer of the CNN model, the output layer comprising dimensions different from dimensions of the input layer, wherein depth of a filter from amongst the plurality of filters is equal to depth of the input layer, and wherein the output layer is computed by sliding the plurality of filters across the input layer and performing elementwise multiplication to obtain a plurality of resultant layers, and wherein after multiplication, the plurality of resultant layers are added to produce a single feature map.

4. The method as claimed in claim 1, wherein the image sensor, the location sensor and the weight sensor are configured in a container capable of receiving the plastic item.

5. A system comprising:
a memory storing instructions;
one or more communication interfaces; and
one or more hardware processors coupled to the memory via the one or more communication interfaces, wherein the one or more hardware processors are configured by the instructions to:
obtain a plurality of input images of a plastic item using an image sensor, a location of the plastic item using a location sensor, and weight of the plastic item using a weight sensor;
predict, by a trained Convolutional Neural Network (CNN) model, a type of resin associated with the plastic item based on the plurality of input images, the location and the weight of the plastic item, via the one or more hardware processors, wherein to train the CNN model, the one or more hardware processors are configured by the instructions to:
receive a training data at the CNN model, the training data comprising a plurality of training images captured through various orientations of a plurality of plastic items, and weight and location data of the plurality of plastic items,
extract, by using a plurality of filters, a plurality of features from the training data by processing an image data associated with the plurality of input images to obtain a plurality of physical attributes, and processing non-image data comprising the weight and location of the plurality of plastic items, wherein the image data is processed by a convolution component of the CNN model and the non-image data is processed by a feedforward component of the CNN model, and wherein one or more localized areas of the plurality of training images are computed through Histogram of Oriented Gradients;
map the plurality of features with a set of resin identification codes based on the plurality of physical attributes to identify a label for the plastic item, wherein the label comprises a type of resin of the plastic item; and
associate the type of resin associated with the plastic items of the training data based on the plurality of features; and
share the type of resin, weight and location of the plastic item with a sever.

6. The system as claimed in claim 5, wherein the image data comprises shape, color, logo, brand name, resin type, brand label, and text printed on the plastic item.

7. The system as claimed in claim 5, wherein to process by the convolution component, the one or more hardware processors are configured by the instructions to apply a plurality of filters to the input image to produce an output layer of the CNN model, the output layer comprising dimensions different from dimensions of the input layer, wherein depth of a filter from amongst the plurality of filters is equal to depth of the input layer, and wherein the output layer is computed by sliding the plurality of filters across the input layer and performing elementwise multiplication to obtain a plurality of resultant layers, and wherein after multiplication, the plurality of resultant layers are added to produce a single feature map.

8. The system as claimed in claim 5, wherein the image sensor, the location sensor and the weight sensor are configured in a container capable of receiving the plastic item.

9. One or more non-transitory machine readable information storage mediums comprising one or more instructions which when executed by one or more hardware processors cause a method comprising:
obtaining, via one or more hardware processors, plurality of input images of a plastic item using an image sensor, a location of the plastic item using a location sensor, and weight of the plastic item using a weight sensor;
predicting, by a trained Convolutional Neural Network (CNN) model, a type of resin associated with the plastic item, based on the plurality of input images, the location and the weight of the plastic item, via the one or more hardware processors, wherein training the CNN model comprises:
- receiving a training data at the CNN model, the training data comprising a plurality of training images captured through various orientations of a plurality of plastic items, and weight and location data of the plurality of plastic items,
- extracting, by using a plurality of filters, a plurality of features from the training data by processing an image data associated with the plurality of input images to obtain a plurality of physical attributes, and processing non-image data comprising the weight and location of the plurality of plastic items, wherein the image data is processed by a convolution component of the CNN model and the non-image data is processed by a feedforward component of the CNN model, and wherein one or more localized areas of the plurality of training images are computed through Histogram of Oriented Gradients;
- mapping the plurality of features with a set of resin identification codes based on the plurality of physical attributes to identify a label for the plastic item, wherein the label comprises a type of resin of the plastic item; and
- associating the type of resin associated with the plastic items of the training data based on the plurality of features; and
- sharing, via the one or more hardware processors, the type of resin, weight and location of the plastic item with a sever.

* * * * *